United States Patent
Henderson et al.

(10) Patent No.: US 6,484,194 B1
(45) Date of Patent: Nov. 19, 2002

(54) LOW COST MULTIPLIER BLOCK WITH CHAIN CAPABILITY

(75) Inventors: Alva Henderson, Sherman, TX (US); Francesco Cavaliere, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/334,995

(22) Filed: Jun. 17, 1999

Related U.S. Application Data (60) Provisional application No. 60/090,589, filed on Jun. 25, 1998, and provisional application No. 60/089,572, filed on Jun. 17, 1998.

(51) Int. Cl.[7] .................................................. G06F 7/52
(52) U.S. Cl. ........................ 708/627; 708/620; 708/625
(58) Field of Search ................................. 708/620, 625, 708/627

(56) References Cited

U.S. PATENT DOCUMENTS

| | | | |
|---|---|---|---|
| 4,627,021 A | | 12/1986 | Persoon et al. |
| 4,754,421 A | * | 6/1988 | Bosshart .................... 708/625 |
| 4,809,212 A | * | 2/1989 | New et al. .................. 708/625 |
| 5,436,860 A | | 7/1995 | Shankar et al. |
| 5,602,766 A | * | 2/1997 | Bauer et al. ................ 708/603 |
| 5,657,262 A | | 8/1997 | Curtet |
| 5,771,186 A | | 6/1998 | Kodali et al. |
| 6,014,684 A | * | 1/2000 | Hoffman ..................... 708/625 |
| 6,233,597 B1 | * | 5/2001 | Tanoue et al. .............. 708/625 |

FOREIGN PATENT DOCUMENTS

| | | |
|---|---|---|
| EP | 0 576 154 A1 | 12/1993 |
| JP | 61015233 | 1/1986 |

OTHER PUBLICATIONS

IBM Technical Disclosure Bulletin, Feb. 1981, vol. 23, pp. 4322–4323.*

* cited by examiner

Primary Examiner—Tan V. Mai
(74) Attorney, Agent, or Firm—Alan K. Stewart; W. James Brady, III; Frederick J. Telecky, Jr.

(57) ABSTRACT

This application describes a method of multiplying numbers represented in multiple-word chains. The multiplication scheme allows for the multiplication of both signed and unsigned numbers of varying lengths. The multiplier block 30 executes a 17-bit by 17-bit two's complement multiply and multiply-accumulate in a single instruction cycle. A 4-bit shift value register with a 4 to 16 bit decoder 35 allows the multiplier to do a 1-16 bit barrel shift on either a 16-bit operand or an (N×16)-bit chain operand.

3 Claims, 9 Drawing Sheets

LOW COST MULTIPLIER BLOCK WITH CHAIN CAPABILITY

This application claims priority under 35 USC §119 (e) (1) of Provisional Application No. 60/090,589, filed Jun. 25, 1998, and Provisional Application No. 60/089,572, filed Jun. 17, 1998.

The present invention relates to the field of electronic data processing, and more particularly to a microprocessor having a built-in multiplier block with "chaining," or multiple-word multiply, capability.

BACKGROUND AND SUMMARY OF THE INVENTION

Background: Microprocessor Operation

Microprocessors are often required to manipulate binary data having wide ranges of bit lengths, for example data that ranges from a single logic bit to high precision arithmetic operations involving data that may be more than 128 bits in length.

Hardware arithmetic logic units (ALUs) within microprocessors are generally constructed and arranged to handle fixed operand lengths. As a result, high precision arithmetic operations require multiple program steps and multiple microprocessor cycles. These data processing conditions lead to programs that are inefficient in terms of execution time because the microprocessor hardware and the supporting program instruction set are not optimized for operating on data having a wide range of operand lengths.

This inefficiency results in large part from repeated stores and loads to memory as well as software loop control overhead (compares, branches, etc.) For complex operations such as multiplication and operations involving extended-precision algorithms the overhead is even more pronounced. In addition, the sign (negative or positive) and zero status of an arithmetic result must be handled separately for multi-word calculations, requiring even more processor time to complete the operation.

Background: Digital Signal Processors

Digital Signal Processors (DSPs) are high-speed microprocessors optimized to carry out large numbers of arithmetic operations in a short period of time. As the name implies, DSPs were developed to carry out real-time processing (e.g., filtering, compression, encryption) algorithms on digital signals. DSPs incorporate performance-optimized arithmetic structures not found in conventional microprocessors. Among the devices incorporated into DSPs to improve number-crunching performance, two of the most important are the hardware multiplier block and the barrel shifter.

Background: Multiplier Blocks

As with most structures in a DSP, hardware multiplier blocks are high-performance, speed-optimized structures. Unfortunately, DSP hardware multiplier blocks require large amounts of chip surface area for specialized signal-processing circuitry. In addition, an increase in the size of the multiplier block generally requires a concomitant increase in the size of a CPU's data buses and arithmetic logic units (ALUs). For example, the multiplication of two 16-bit numbers gives a 32-bit result. A multiplier block able to handle this 16-bit multiplication would generally require 32-bit data buses, arithmetic logic units (ALUs), and accumulators to accommodate the result. This adds considerably to the complexity, and therefore the cost, of a microprocessor. It is also desirable, especially in signal processing applications, to have the capability to multiply numbers of more than one word in length. Unfortunately, the complexity and size of a multiplier block quickly grows unmanageable as the size of its operands increases.

Conventional microprocessors often do not incorporate a hardware multiplication block or barrel shifter, as the size and cost is prohibitive, especially in the cost-competitive consumer market. In a conventional lower-end processor, numbers are multiplied by repetitive additions in a multi-bit adder, a relatively slow process. A typical multiplication carried out in software requires a long series of shifts and adds, requiring a great deal of processor time. From a speed standpoint, it would be highly desirable to have the performance and functionality of a hardware multiplier block built into a low-cost microprocessor, but the complexity and space requirements of the related hardware have traditionally made such a design cost-prohibitive.

Background: Barrel Shifters

A barrel shifter is another speed-optimized DSP structure extremely useful for large calculations. Barrel shifters are designed to shift a number several bit positions in a single operation. Although a barrel shifter is similar in function and structure to a multiplier block, it is conventionally designed in as a completely separate structure on the chip. In binary arithmetic, a shift left of one bit position equates to a multiply by two. A left shift of N bits is equivalent to a multiply by $2^N$.

Conventional low-end processors do not incorporate barrel shifters, but carry out barrel shifting through a series of single position shifts, each shift comprising a single software operation. Barrel shifting is a highly desirable function in a processor, but the specialized circuitry required to carry out this function takes up too much space on a chip to be included in low-cost processors. The barrel-shifting function could be carried out by a multiplier block if the numbers were encoded properly, but if the encoding must be implemented in software, the overhead significantly reduces any performance gains from a hardware barrel shift.

Background: Chain Processing

It is known that prior microprocessors have included the capability of operating on chains, for example by repeating a given instruction a prescribed number of times. It is known that a repeat add with carry will execute a chain operation where the data memory address of the operands and the result are automatically incremented after each operation. It is also known that others have used fixed hardware multipliers to do extended precision multiplies by using a multiply-by-parts algorithm, a complex and relatively inefficient solution.

As mentioned, microprocessors typically must manipulate operands of differing, sometimes widely differing, lengths. Operand lengths can vary from a single logic bit to 512 bits or more. Arithmetic logic units (ALUs), on the other hand, have a fixed width. Where high-precision arithmetic is necessary, requiring operands longer than the ALU, the processor must execute the operation in multiple steps. The programs become inefficient in terms of execution time and programming code efficiency because the basic hardware and supporting instruction set are not optimized for operating on extended-precision data represented by a sequential chain of data words.

Where a number that is one word in length must be multiplied by a number greater than one word in length (chain multiplication), the process can be extremely cumbersome even in designs incorporating a multiplier block. Such a multiplication is carried out by a series of one-word sub-multiplications beginning with the least significant word. For each sub-multiplication, the code must instruct the processor to (1) carry out the single-word multiplication (either in hardware or software), (2) store the lower word of the result to memory, (3) move the higher word of the result to the correct operand register for the next sub-multiplication, (4) check to see if the operand chain is complete, and if not, (5) loop back to start the process over again. This process carries with it a heavy amount of instruction-decode and data-shifting overhead, slowing the multi-word multiplication process down considerably.

The need remains in the art for an enhanced multiplier with specialized architecture to address the problem of operating on long, multiple word length data in an efficient, consistent and unified manner.

Multiplier Block With Chain Capability

This application discloses a multiplier block making use of a "chaining" device and integral barrel shift circuitry to increase arithmetic throughput while avoiding many of the liabilities of DSP logic. In order to avoid the inclusion of a double-width (32-bit) ALU and accumulator and yet still accommodate the double-precision (32-bit) result of the multiplier, the 32-bit product of the static multiplier block is split into two parts. The lower 16 bits pass directly to the ALU for immediate use (transfer, accumulate, etc.). The upper 16 bits are latched into a 16-bit register (known as Product High) for later use. The Product High register can be ported directly back to the multiplier block for continuous, multi-word (chain) multiplication. This optimization is totally consistent with the single data memory, single data bus designs found in most microprocessors, which require two cycles to set up two multiplier operands.

This invention optimizes the design of the multiplier block to minimize cost and increase flexibility, so that it can be included in very low cost microprocessors and single chip microcomputers. The basic function of the multiplier block is the execution of a single-cycle 17-bit×17-bit multiplication yielding a 34-bit product. In the preferred embodiment, the operand can be interpreted as either signed or unsigned. The multiplier incorporates the capability to do a one-word (16-bit) by N-word chain (up to 496-bits) multiplication yielding up to a 512-bit result.

In addition, the multiplier can provide a general purpose barrel shift function. A 4-bit shift value register with a 4-to-16 bit decoder allows the multiplier block to do a 1- to 16-bit barrel shift on either a 16-bit operand or an N * 16-bit chain operand. The long chain barrel shift is unique to multiplier block functions.

The relatively small area needed for the multiplier block and barrel shift circuitry, resulting from the elimination of specialized DSP structures such as look-ahead logic and pipeline circuitry, allows the processor to incorporate much of the functionality and performance of a digital signal processor in a low-cost product.

Background: Mixed-Signal Processor With Chaining Capability

The multiplier block disclosed in this application is incorporated into a low-cost microprocessor suitable for incorporation into consumer products. The microprocessor and its specialized instruction set provide efficient data processing on data types ranging from one bit to 512 bits in length. The preferred embodiment incorporates specialized hardware structures and specific instruction set enhancements that facilitate operations on multiple word width data in an efficient, consistent, and unified way. Every instruction word that manipulates data has a reserved bit switch that will cause the instruction to be executed either once (operating on single word data) or as a repeated execution of the same instruction (operating on a chain or list of sequential data).

According to the preferred embodiment, several hardware structures are necessary to support this extended precision instruction set definition. First, a hardware chain register with counter was included to control the repeat count and number of words in the chain. Second, a register file was implemented to provide the accumulation function for the ALU. Third, specialized address control was necessary to control the sequential acquisition of up to two input operand chains and one output operand chain. Fourth, extra ALU status logic was included to handle arithmetic and logical status in a unified way independent of data width. Fifth, the product high register was routed to the partial sum input of the hardware multiplier to enable a consistent chain multiply function.

The preferred embodiment provides a one-word length ALU (31 of FIG. 1), provides the concept of word chains, and in the preferred embodiment provides for the ability to specify four different storage areas that each store a pair of chain values, thus overcoming disadvantages of prior microprocessors.

The disclosed embodiments look at data in a consistent way and have very few limitations on the number of bits used to represent data. Software instructions are essentially identical for operating on either single 16-bit words or extended 512-bit word chains. Execution time is extended linearly with the number of words in the operands, with little or no software overhead. The code is compact, logical and easy to understand.

These and other features and advantages of the innovative processor hardware will be apparent to those of skill in this art upon reference to the following detailed description of preferred embodiments of the invention, which description makes reference to the drawings.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The multiplier block, according to the preferred embodiment is of general utility, and finds particular utility in applications such as high speed calculators and medium speed digital signal processor (DSP) systems. The processor into which it is incorporated can be used with a variety of different memory configurations and with a variety of different peripheral devices to create a wide variety of application-specific consumer products.

Multiplier Structure

The preferred embodiment of the single-cycle-multiplier disclosed herein is constructed and arranged to multiply one 16-bit multiplier-operand by a multiplicand-operand that may comprise one word of a multiple word chain. The resulting product is one word longer than the input word chain.

Figure 1:
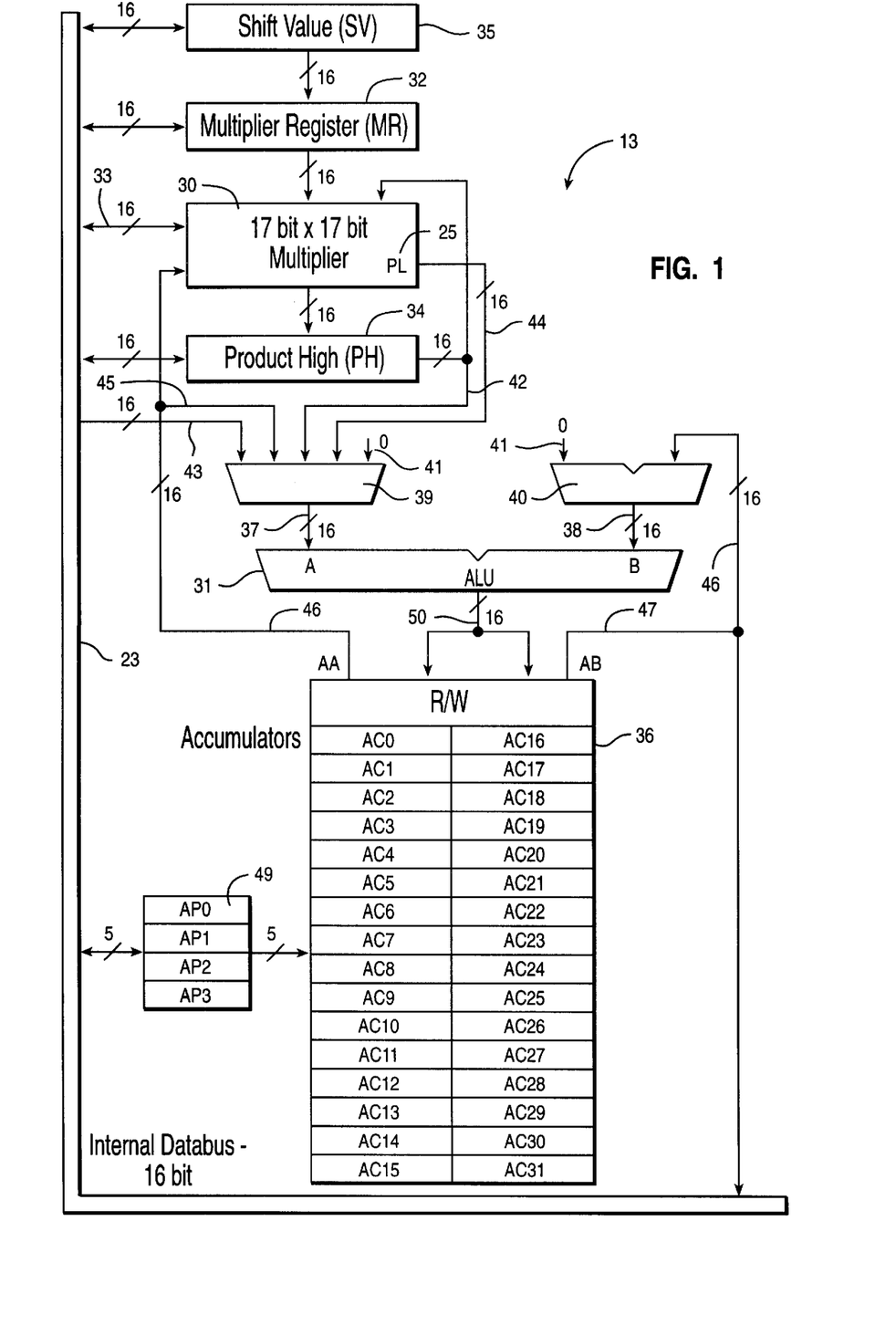
FIG. 1 is a circuit diagram depicting the disclosed multiplication scheme.

The operation of the computational unit (CU) of which the multiplier forms a central part is depicted in FIG. 1. The CU is comprised of the 17-bit×17-bit Booth's algorithm multiplier block 30 and a 16-bit arithmetic/logic unit (ALU). Multiplier block 30 is served by four system registers: a 16-bit multiplier register (MR) 32, a 16-bit write-only multiplicand input 33, a 16-bit high-word register (PH) 34 that holds the upper 16-bits of a 32-bit multiplier output, a low-word output 25 that contains the lower 16-bits of a 32-bit multiplier output, and a 4-bit shift-value register (SV) 35.

The preferred embodiment is a purely static 17-bit by 17-bit multiplier block, executing a 17-bit by 17-bit two's complement multiply and multiply-accumulate in a single instruction cycle. The physical array is comprised of nine 17-bit adders carrying out a traditional Booth's algorithm multiply operation. The 17th bit is necessary to facilitate both signed and unsigned interpretation of the 16-bit input operand data.

One or both of the multiplier operand and the multiplicand operand can be forced to have the $17^{th}$ bit set to a positive value (i.e. a signed operand), or one or both of these operands can be forced to have a $17^{th}$ bit that is of a binary value that is equal to the binary value of its $16^{th}$ bit (i.e. an unsigned operand).

The lower 16-bits of the resulting 32-bit product are multiplexed to ALU 31 during the same instruction cycle, and this 16-bit product is loaded-to, or is arithmetically combined-with, a word register AC(0)-AC(31) that is within accumulator register file 36. The upper 16-bits of the 32-bit product are latched into PH 34 at the end of the instruction cycle.

The multiplicand operand for multiplier 30 obtained from data memory is a register word AC(0)–AC(15) from accumulator 36, or is its offset register word AC(16)–AC(31). The multiplier operand for multiplier 30 is either from 16-bit MR 32, or is from 4-bit SV 35. MR 32 stores this multiplier operand.

Figure 2A:
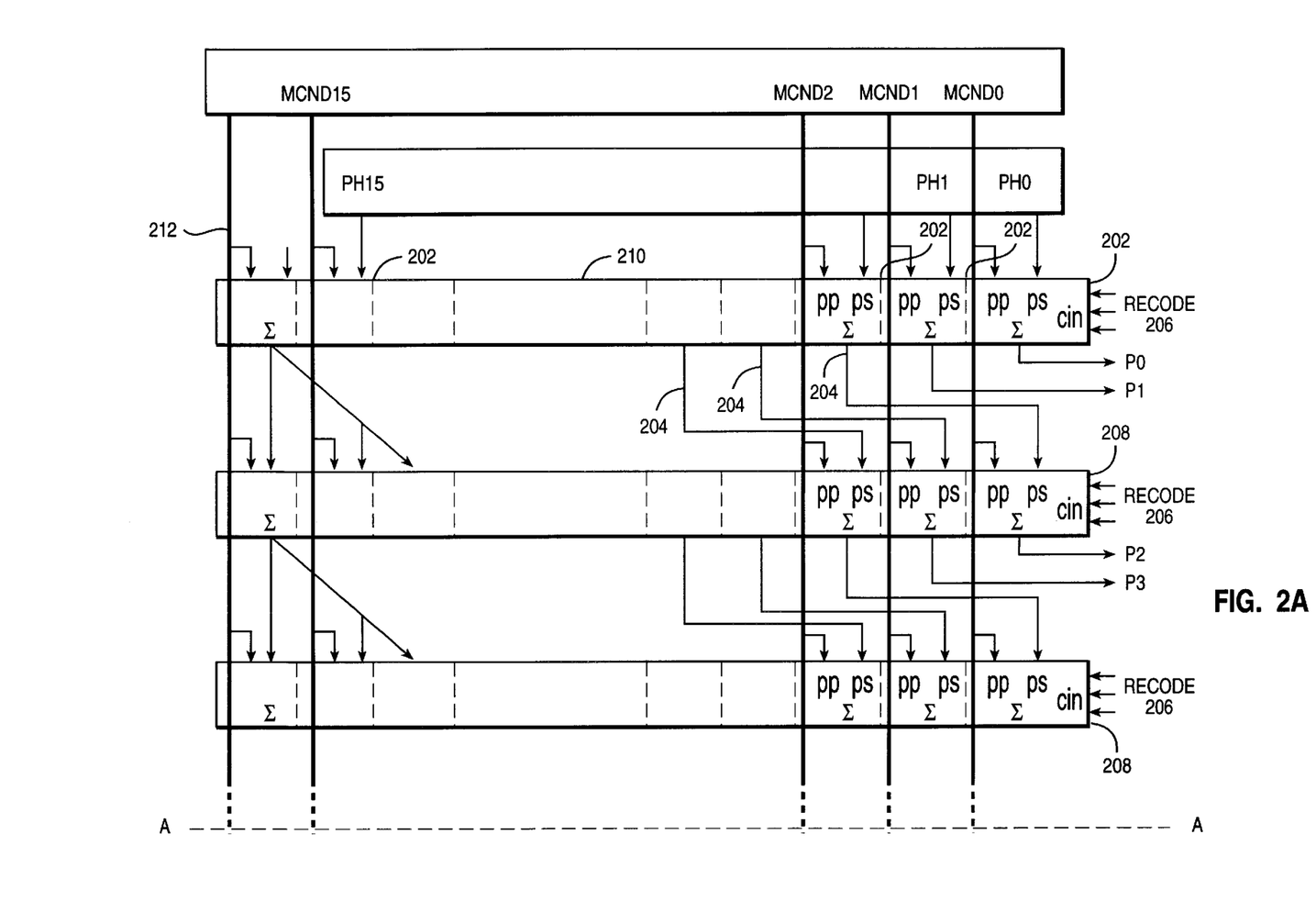
FIGS. 2A–2B is a detailed diagram of the 17×17 multiplier block.
Figure 2B:
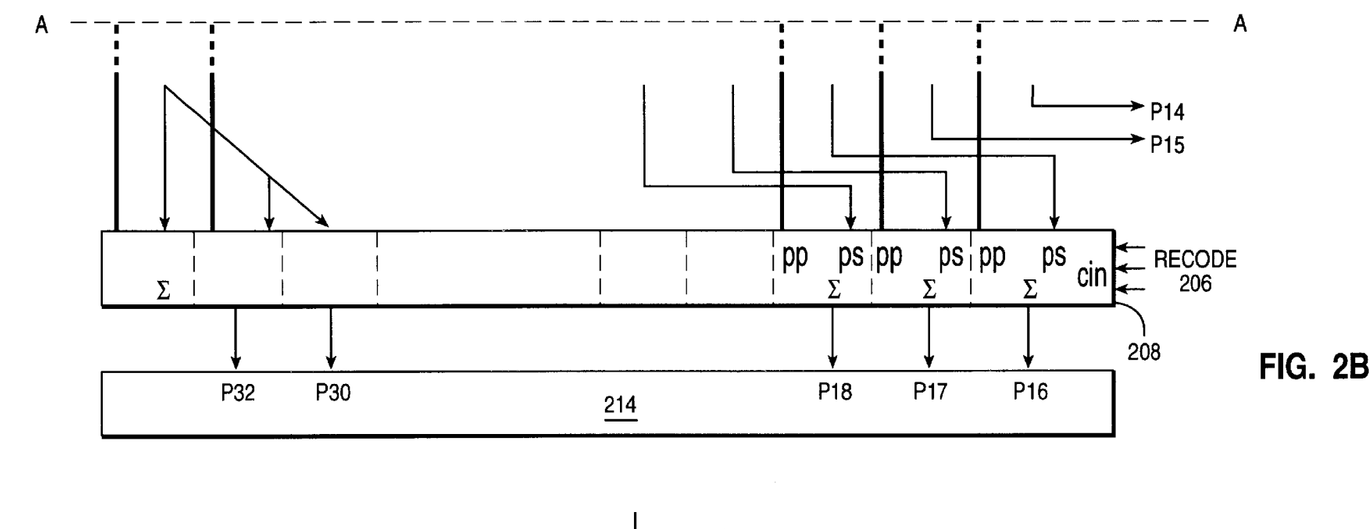

The preferred embodiment is shown in detail in FIG. 2. Each block 202 is a full adder and recode multiplexor. The two addends are a recoded multiplexed value from the multiplicand bus (MCND) and the shifted previous partial sum from the adder output 204 above. The recode inputs 206 controlling the nine 17-bit ripple carry adder blocks 208 come from the multiplier source. The initial partial sum in the first 17-bit adder block 210 is conditionally connected to the Product High (PH) register to support chain multiplication. The $17^{th}$ line of the MCND bus 212 is either the extended $16^{th}$ bit of MCND or 0, depending on whether the multiplier is in signed or unsigned multiplication mode. The adders 202 use ripple carry propagation, taking the carry from the adder on the right and propagating a carry out to the left. Bits P0 through P15 of the output (product low) go to the arithmetic logic unit multiplexor 214. Bits P16–P31 go to the Product High register for use in chain multiplication.

In the preferred embodiment, the resulting product will be one word longer than the multiplicand operand. Since the multiplicand operand length is controlled by the chain register/counter, an extra cycle is required for all chain multiplies. Therefore, in the preferred embodiment, while 16×16-bit operations do not require an extra cycle, chain-multiplies and barrel-shift operations will require an additional cycle for the final accumulation.

Multiplier Sign Control

As described above, the preferred embodiment multiplies two 17-bit two's compliment coded numbers, yielding a two's compliment 34-bit product. If the 16-bit operands are to be interpreted as unsigned, the 16-bit operands are simply extended with a $17^{th}$ positive sign bit; the lower 32 bits of the product will then give the correct unsigned result. If the data is to be interpreted as signed, the $17^{th}$ bits are set equal to the 16th bit (i.e., the sign bit is extended) so that the lower 32 bits of the product will contain the correct signed result.

Both the multiplier and multiplicand operands can be independently forced to have the 17th sign bit forced to a positive value (0) or to a value equal to the most significant bit of the loaded operand (16th bit). This selection permits both signed and unsigned multiplication. The lower 16 bits of the resulting product are multiplexed to the ALU during the same instruction cycle and are either loaded to, or arithmetically combined with, an accumulator register.

Since the multiplier can interpret the operands as either signed or unsigned, chain multiplication requires that all word multiplies except the last be forced to an unsigned mode. In order to provide for correct and unified arithmetic and status extraction with respect to single data word operations, the carry-out bit is linked with the carry-in bit of the next word calculation, and the word-status bit (equal or zero) is logically ANDed. In addition to making additions and subtractions correct, long chain comparisons also reflect the correct status.

Product High Register

During chain multiplication (multiplication of a multiple-word operand), the contents of the Product High register are routed back to the partial sum input of the first adder in the multiplier block. In this state, the multiplier is fully prepared to carry out multiplication of the next word in the chain. This design enables the multiplier block to carry out multiplication of operands several words long with a minimum of execution time overhead.

At the beginning of each multiplication, the Product High register is set to zero. For the 2nd through Nth cycle, the upper 16 bits of the last word multiply is routed to the Product High register. This enables N×1 word multiplies to generate a N+1 word product in N+1 instruction cycles with no other software overhead. The ability to extend the string with extended sign word allows very efficient N word chains×M word chain multiplies to be implemented in software.

Operand Source

In the preferred embodiment, the multiplicand source can be either data memory, accumulator, or accumulator offset.

The multiplier operand source can be either the 16-bit Multiplier Register (MR) for multiply operations, or the Shift Value (SV) register for barrel shift operations. For all multiply operations, the MR stores the multiplier operand.

All three multiplier registers (PH, SV, and MR) can be loaded from memory and stored to memory. In addition, data can be transferred from an accumulator register and PH or vice versa. Both long and short constants can be directly loaded to the MR register from program memory. The multiplicand value is latched in a write-only register from the internal data bus (DB) and this value cannot be read or transferred to memory or other system registers.

Barrel Shift Operation

This multiplier carries out barrel shift operations through the use of an integral 4-to-16 bit decoder using the 4-bit shift value register (SV) as input. For example, when a value of 7 (0111 binary) is loaded to the SV register, a multiplier operand of 0000 0000 1000 0000 binary will be loaded to the multiplier block. The multiplier block output will then reflect the value of the multiplicand shifted left 7 bit positions. If the status bit FM (multiplier shift mode) is set to one in the status register (STAT), the multiplier operand is shifted left 1 bit to form a 17 significant bit operand. This mode is included to avoid a divide by 2 of the product when interpreting the input operands as signed binary fractions.

Computational Optimization

The concept of chains, as described the the "background and summary" above, is not new and other processors have mechanisms to repeat a given instruction a prescribed number of times. The preferred embodiment is more comprehensive and provides very efficient code for high precision calculations. It is consistent for all multiply and shift operations maintaining correct status for data widths from 1 bit to chains of 512 bits. Code for executing a single operation or a chain operation is identical and compact. The hardware multiplier operation provides a very efficient and simple execution of multiplies of up to 256×256 bits=512 bit product. This provides distinct advantages over current implementations, which do not address chain multiplication. Further, many known systems use a fixed hardware multiplier to do extended precision multiplies using a "multiplication by parts" algorithm which is complex and much less efficient.

Processor Architecture

This multiplier block is designed to be incorporated into a low-cost mixed-signal processor. The basic architecture of the processor incorporating the presently preferred embodiment includes a high speed computational-unit (CU) and a full-featured data-memory-address-unit (DMAU). In the preferred embodiment, the processor incorporates Harvard architecture (separate data and program memory spaces,) thus permitting parallel access and maximum computational throughput. In order to achieve minimum power consumption, static logic implementations form the processor's functional blocks, with major functional blocks being disabled when not in use. A number of different internal memory sizes and types can be combined with customized peripheral devices and interrupt logic to provide a wide variety of customized devices, each of a different utility.

In the presently preferred embodiment, but without limitation thereto, program and data memory is restricted to internal memory blocks that can not be expanded by the use of external memory. Program memory comprises ROM, EPROM, or OTP, for example the quantity 64K of 17-bit words. Data memory is RAM. In accordance with the spirit and scope of the invention, different embodiments feature different combinations of program and data memory sizes, with program memory generally comprising at least 16K of 17-bit words. When mass data storage is required, an auxiliary data memory peripheral interface can be provided.

Figure 3A:
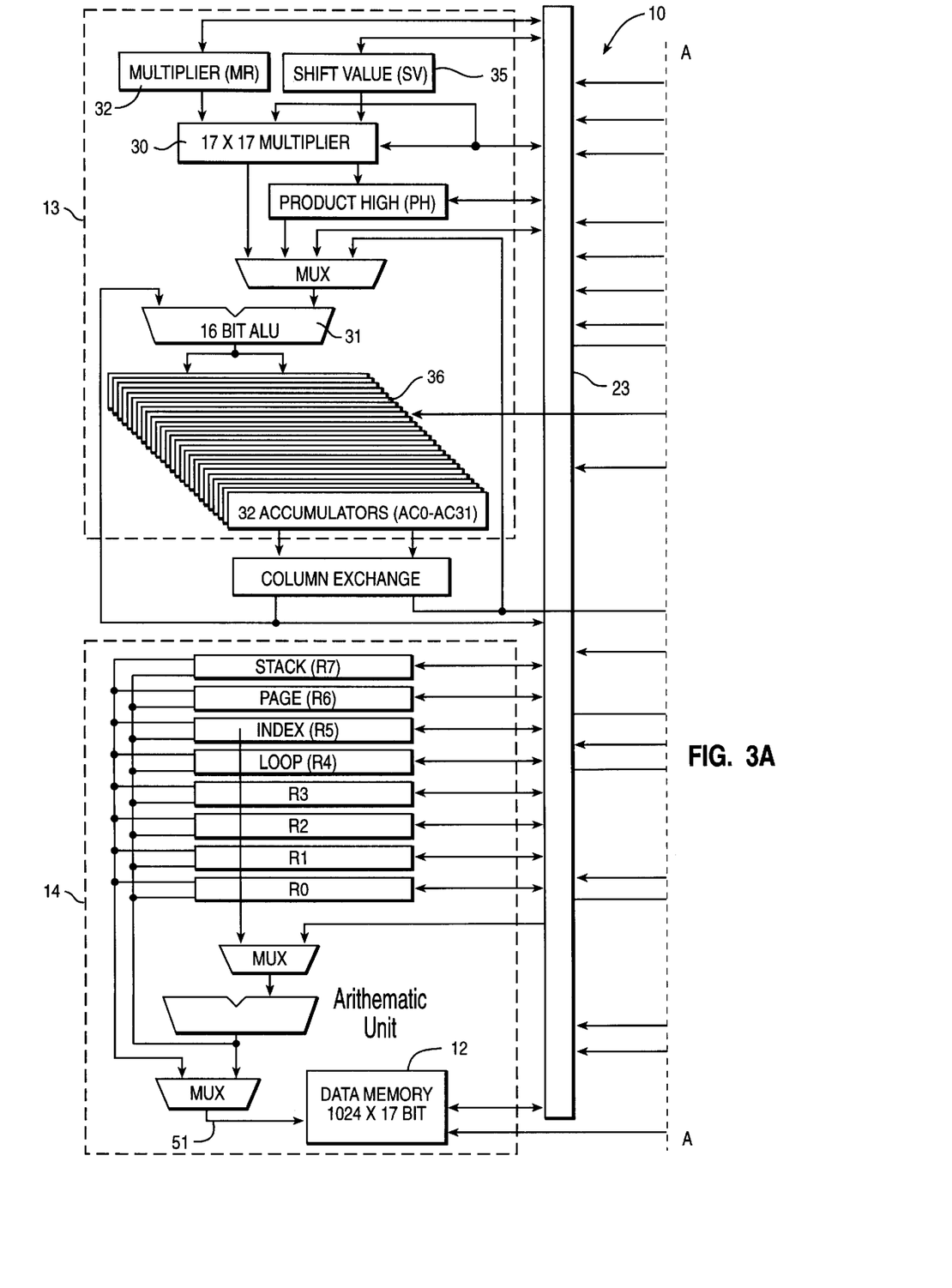
FIGS. 3A–3B depicts a block diagram of a mixed-signal processor.
Figure 3B:
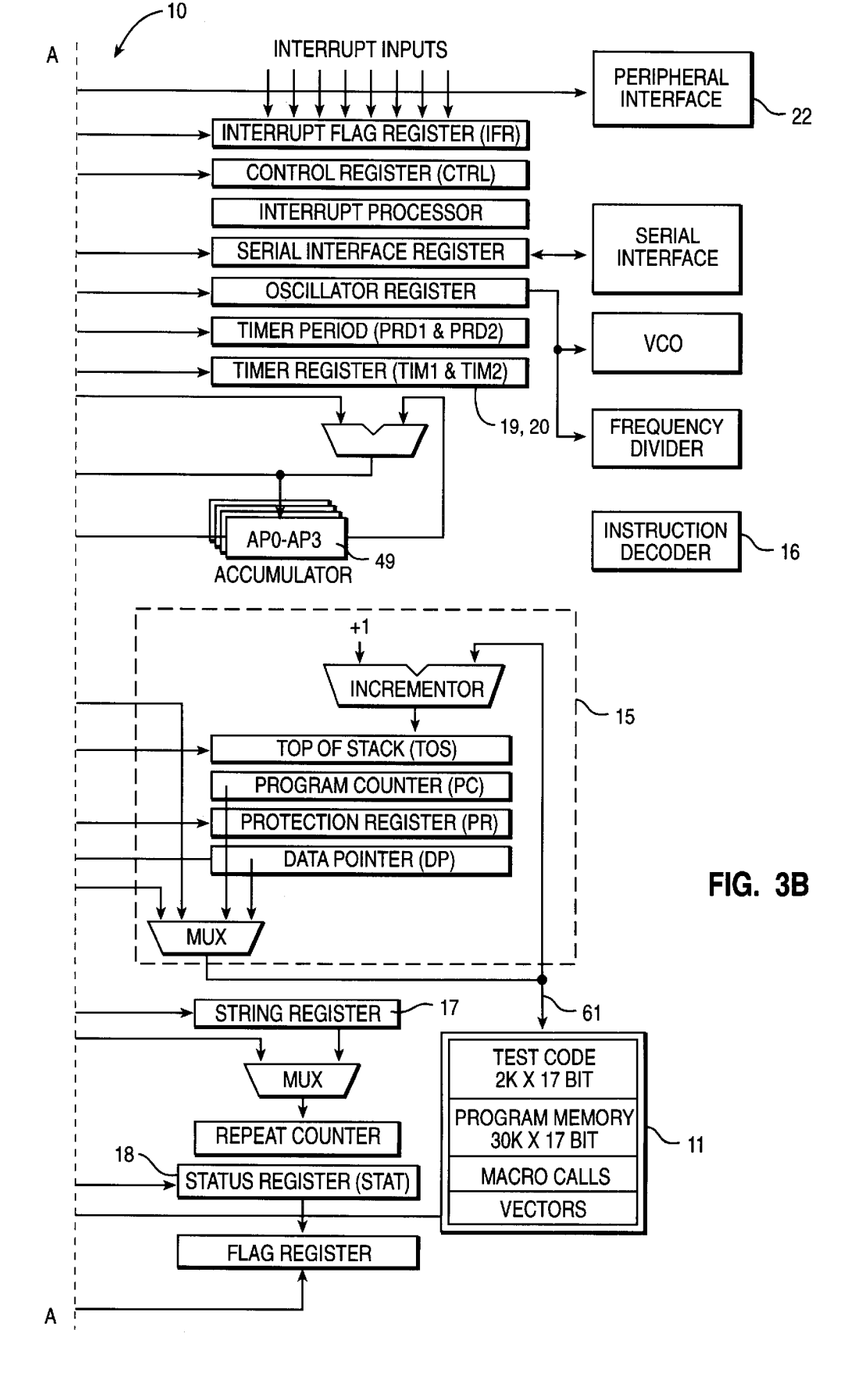

With reference to FIG. 3, a processor 10 incorporating a multiplier block according to the preferred embodiment comprises a number of major sub-blocks, including a program-data memory block 11 and a data-memory block 12. The major sub-blocks comprise the above-mentioned computational-unit (CU) 13 and the above-mentioned data-memory-address-unit (DMAU) 14, a program-counter unit (PCU) 15, and an instruction decoder 16. Other functions are provided by a repeat or chain-counter register 17, a status register 18, two timers 19 and 20, interrupt logic 21, and a peripheral expansion interface 22.

A 17-bit data bus (DB) 23 provides communication between the functional blocks within processor 10. Most of the registers within processor 10 have read and write access to DB 23. The bus drivers (not shown) are static devices in order to avoid unnecessary power consumption, and in order to provide a maximum logic propagation time. The minimum instruction period of processor 10 is about 100 ns, with a 10 nHz processor clock (not shown) being provided.

Data memory 12 of FIG. 3 is organized as a plurality of 17-bit parallel words. The number of words varies in accordance with the application to which processor 10 is applied, but the range of 256 to 2048 words is exemplary, with 1152 words being indicated in FIG. 3. Each address 51 that is provided by DMAU 14 causes 17 bits of data to be addressed. These 17 bits will be operated on in a number of different ways, depending upon the instruction being executed. For most instructions this data is interpreted in a 16-bit word format. Two byte instructions, such as LACB and SACB cause processor 10 to read or write data in an 8-bit word format, also called a byte format. This byte format mode causes the processor hardware to read or write either the upper or the lower byte of the addressed 16-bit word, and the fetched byte is right-justified on DB 23.

In a flag-data mode, an instruction operates only on the $17^{th}$ bit of the fetched word. The $17^{th}$ bit is always read and then loaded into the MTAG bit of FIG. 3's status-register 18 for all reads of data memory 12, thus providing for the tagging of either word or byte data. For byte mode, two consecutive bytes have the same tag associated therewith. Tagged data is used by FIR, FIRK, COR and CORK instructions to emulate a circular buffer. The MTAG bit of the status-register can also be tested as a condition for branch/call instructions, or it can be combined with other test conditions and other flags to generate new conditions.

FIG. 1 shows FIG. 3's CU 13 in greater detail. CU 13 includes the 17-bit by 17-bit Booth's algorithm multiplier 30 and a 16-bit ALU 31.

As explained above, multiplier 30 is served by four system registers, i.e. a 16-bit multiplier register (MR) 32, a 16-bit write-only multiplicand input 33, a 16-bit high-word register (PH) 34 that holds the upper 16-bits of a 32-bit multiplier output, a low-word output 25 that contains the lower 16-bits of a 32-bit multiplier output, and a 4-bit shift-value register (SV) 35.

The 16-bit output 50 of ALU 31 is stored into one 16-bit location of a 32-word-location accumulator register file 36. Accumulator register file 36 operates to supply one 16-bit operand to ALU 31 (this one operand being an addressed one of the 32 words that are within accumulator register file, or being its offset), or accumulator register file 36 operates to supply two 16-bit operands to ALU 31 (these two operands being both the addressed accumulator register file word and its offset).

Multiplier 30, discussed above, executes a 17-bit by 17-bit 2's complement multiply within a single instruction cycle of processor 10. One or both of the multiplier operand and the multiplicand operand can be forced to have the $17^{th}$ bit set to a positive value (i.e. a signed operand), or one or both of these operands can be forced to have a $17^{th}$ bit that is of a binary value that is equal to the binary value of its $16^{th}$ bit (i.e. an unsigned operand).

The lower 16-bits of the resulting 32-bit product are multiplexed to ALU 31 during the same instruction cycle, and this 16-bit product is loaded-to, or is arithmetically combined-with, a word register AC(0)–AC(31) that is within accumulator register file 36. The upper 16-bits of the 32-bit product are latched into PH 34 at the end of the instruction cycle.

The multiplicand operand for multiplier 30 that is obtained from FIG. 3's data memory 12 is a register word AC(0)–AC(15) from accumulator 36, or is its offset register word AC(16)–AC(31). The multiplier operand for multiplier 30 is either from 16-bit MR 32, or it is from 4-bit SV 35. MR 32 stores this multiplier operand.

For barrel-shift instructions, the multiplier operand is a 4-to-16 bit decoded value that uses 4-bit SV 35 as an input. For example, a hexadecimal value of 7H in 4-bit SV 35 results in the binary multiplier operand 0000 0000 1000 0000, thus causing a shift-left of 7 bits between the 16-bit multiplicand and the 32-bit product.

All three of the registers PH 34, MR 32, and SV 35 can be loaded from FIG. 3's data memory 12, and the content of these registers can be stored to memory 12. In addition, data can be directly exchanged between a register AC(0)-AC(31) of accumulator register file 36 and PH 34. Both long and short constants can be directly loaded to MR 32 from program memory 11. A multiplicand value is latched in write-only multiplicand register 33 from DB 23, and this multiplicand value cannot be read or transferred to memory or to system registers.

FIG. 1's ALU 31 is the focal point of CU 13 in that ALU 31 is the location within CU 13 where data is arithmetically added, subtracted, or compared. In addition, logical operations on data can occur within ALU 31. The word length of ALU 31 is 16-bits. However, most arithmetic/logical instructions can also operate on a word-chain that comprises a number of 16-bit words. Accumulator register file 36, comprising the number 32 of 16-bit storage registers AC(0)-AC(31), enhances the power of ALU 31 in terms of minimum execution time and minimum program control code.

ALU 31 has two inputs 37,38, also designed A and B in FIG. 1. Input 37, A includes a first multiplexor 39 whereas input 38, B includes a second multiplexor 40.

Multiplexor 39 selects between one of five inputs, i.e. an □ Hall zeros □ input 41, an input 42 that is provided by PH 34, an input 43 that is provided by DB 23, an input 44 that is provided by the PL output 25 of multiplier 30, or an input 45 that is provided by the offset-output 46 or AA of accumulator register file 36. Multiplexor 40 selects between □ all zeros □ input 41 or the AA output 46 that is provided by accumulator register file 36. The □ all zeros □ input 41 is necessary for transfer and unitary operations, and also serves as default values in order to minimize power consumption.

DB 23 input 43 to multiplexor 39 is used to transfer memory values from data RAM 12 and constant values such as program memory operands to ALU 31. PH 34 input 42 and PL 25 input 44 to multiplexor 39 serve multiply-accumulate operations of ALU 31.

Accumulator register file 36 includes two outputs 46, 47, also designated as AA and AB in FIG. 1. These two outputs 46, AA and 47, AB connect to ALU 31 to respectively provide an accumulator-reference and an offset-accumulator-reference to ALU 31.

Operations supported by ALU 31 include the arithmetic operations of addition, subtraction and load (add to zero), logic operations such as AND, OR, XOR, NOT, SHIFTL and SHIFTR, and compare operations that provide a comparison to constant or memory values without destroying values that are within accumulator register file 36.

The preferred embodiment provides a 32-word (16-bits per word) paired accumulator-register-file (AC(0)–AC(31) of FIG. 3), rather than using a single or double accumulator as in prior designs. In addition, unique features are provided in the address unit (14 of FIG. 3) of the disclosed processor that operates to address this accumulator-register-file.

The computational unit's accumulator block consists of 32 accumulators, each 16 bits in size. The 32 registers of the accumulator register file 36 are designated AC(0) through AC(31), with each register being a 16-bit register. Four 5-bit pointer registers 49, designated ACP(0) through ACP(3), are provided to store address pointers for accumulator register file 36. The stored content of each ACP pointer register 49 is used as an direct-reference or address to one of the 16 AC registers AC(0)–AC(15), or as an indirect-reference to an offset AC register AC(16)-AC(31) which has a direct reference that is offset by the number 16. That is, register AC(0) has an offset register at address 16, register AC(1)'s offset is register address 17, etc. Since the register block comprising registers AC(0)–AC(31) is circular--that is, since address-31 when incremented to address-32 results in address-0, the offset of registers 16–31 is registers 0–15, respectively.

Depending upon the program instruction, either or both outputs 46, AA and 47, BB of accumulator register file 36 are used. Some instructions reference only output 46, AA and cannot use or modify the offset-output 47, AB that is fetched at the same time as output 46, AA is fetched. Other instructions provide a selection-field in the instruction word, an example being the □oa □ opcode bit. These later instructions can exchange the column addressing sense, and thus the source or order of the output and the offset-output registers. Also, some instructions can control ALU output 50 to be written either to an accumulator register AC(0)–AC(15) or to its offset accumulator register AC(16)–AC(31).

Accumulator register file 36 provides a workspace that eliminates the need for many intermediate memory load and store operations. In addition, the instructions set for processor 10 includes a 2-bit field, or bit-switch, for all accumulator register file reference instructions so that a direct-reference can be made to one of the four pointer registers 49, thus eliminating memory thrashing that frequently occurs in single accumulator register designs.

An address to accumulator register file 36 is stored in one of the four ACP pointer registers 49, and a direct-reference to a pointer register ACP(0)–APC(3) is made in the 2-bit □ ap □ field of all accumulator referenced instructions. SAPn instructions store the contents of the ACP(n) register to memory 12, whereas LAPn instructions load from memory 12 to the ACP(n) register. An AKACP instruction and an LKACP instruction add or load, respectively, 5-bit constants to the current ACP value.

Figure 5A:
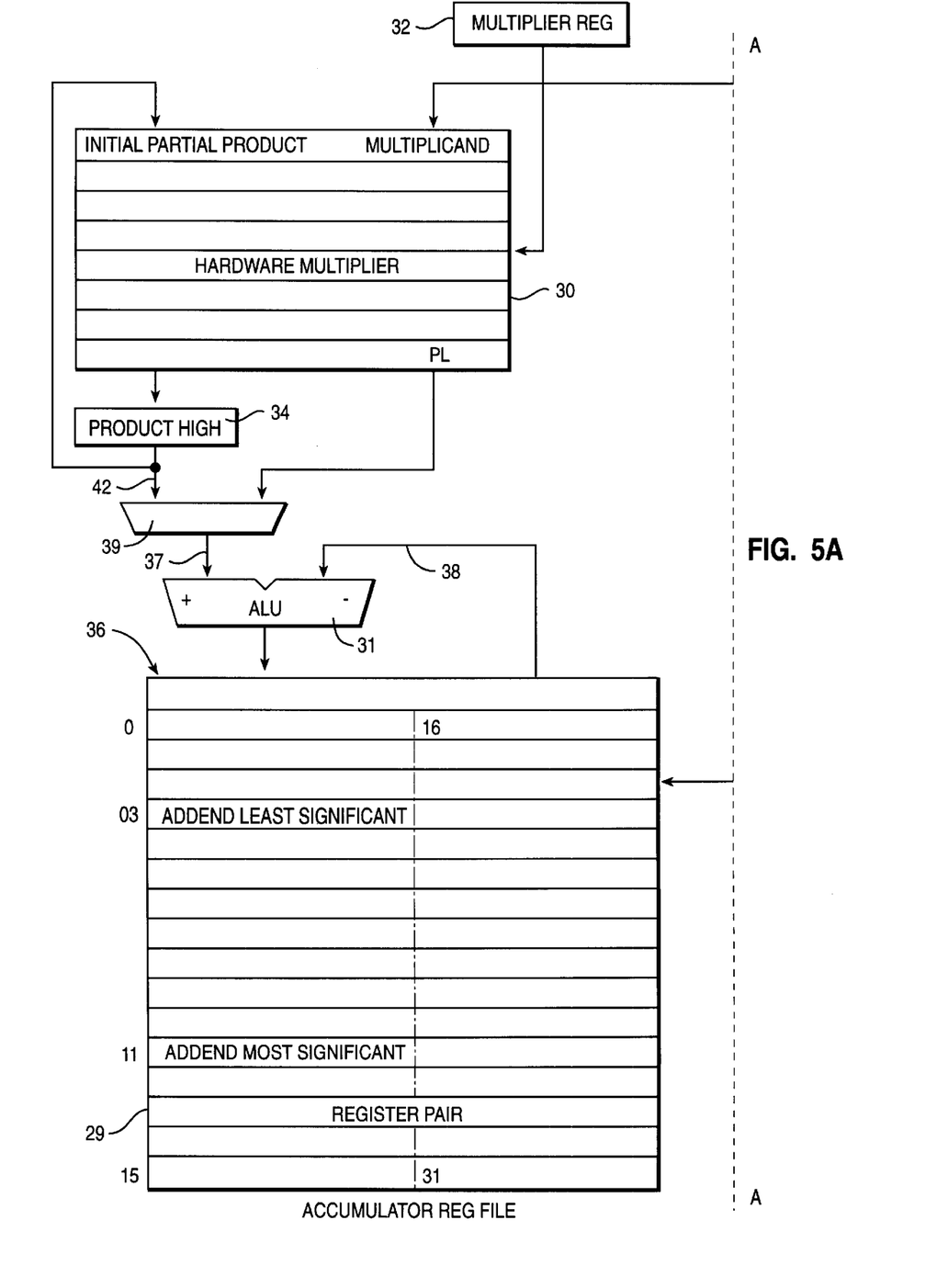
FIGS. 5A–5B is a view generally similar to FIG. 1, but showing data chain manipulation.
Figure 5B:
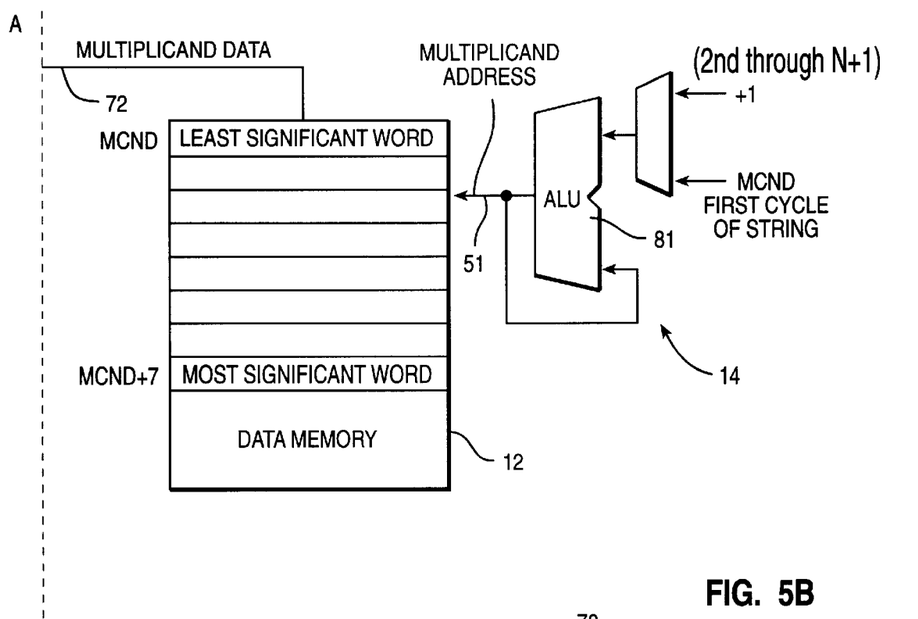

ACP registers 49 are served by a 5-bit processor (80 of FIG. 5) that provides efficient sequencing of accumulator addresses for repetitive operations that are associated with long data chains, or that are associated with relocate operations on a list of data. When operating on a multi-word data chain, an address is copied from an ACP register 49 in order to fetch the LSW in the chain. This copied-address is then repeatedly incremented to fetch the remaining words in the chain. This leaves the address stored in this particular ACP register 49 unchanged, with the value in this ACP register still pointing to the location of the LSW of the word chain. As a result, this ACP register is ready for a subsequent operation on this word chain.

Processor 10 can pre-modify a value in an ACP register 49 by the value +1 or by the value −1 before the ACP register is used by accumulator register file 36 in an accumulator-referenced instruction. This utility minimizes software overhead in manipulating an address of accumulator register file 36, for example by avoiding a software pipe lining effect that post-modification causes.

Figure 6:
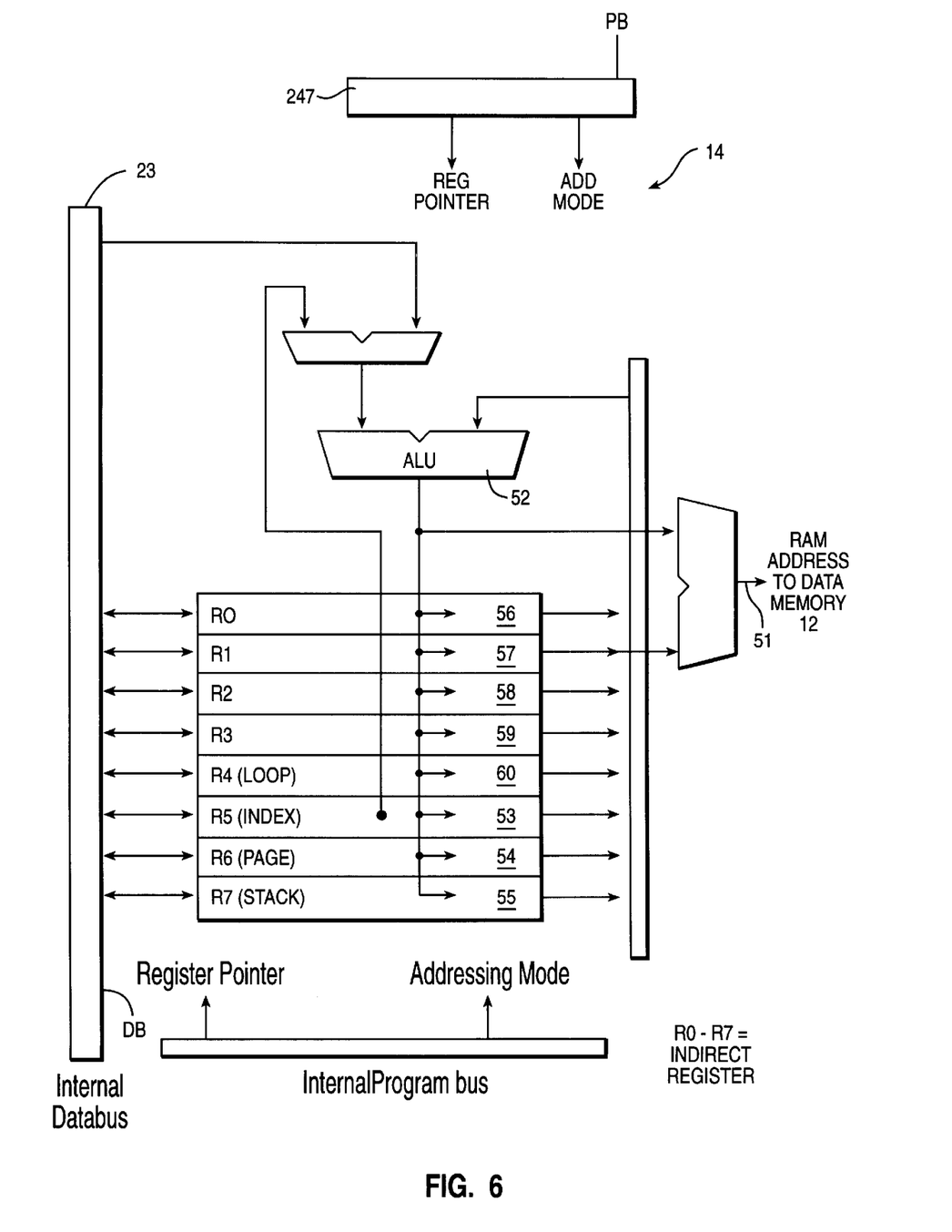
FIG. 6 shows the construction and arrangement of FIG. 1's data memory address unit in greater detail.

FIG. 6 shows DMAU 14 that operates to provide an address 51 to data memory 12. DMAU 14 includes a dedicated ALU 52 that performs add, subtract, and compare functions, three special-purpose address registers 53 (R5 INDEX), 54 (R6 PAGE), and 55 (R7 PGSTK), and five general-purpose registers 56–60 (R0–R4). DMA 14 generates address 51 in parallel with CU 13, thus providing high processor throughput.

DMAU 14 is capable of addressing data memory 12 by way of five addressing modes, i.e. a direct addressing mode, an indirect addressing mode, with post modification being possible, and three relative addressing modes. The three relative modes are (1) immediate-short relative to R6-PAGE (R6-PAGE+7-bit (128 bytes or 64 words)), (2) R5-INDEX relative to register base (Indirect register+R5-INDEX), and (3) long-intermediate relative to register base (Indirect register+16-bit offset).

When word-chain instructions are executed, for all addressing modes with the exception of indirect with post modification, a temporary copy of address 51 is used to fetch the LSW of the word-chain. Over the next sequence of instruction cycles this temporary address copy is auto-incremented in order to fetch the remaining words in the word-chain. Since this sequential increase in address 51 is temporary, all registers 55–60 remain unchanged, and still make reference to the LSW in memory 12.

Chain fetches using the indirect with post modification addressing mode operate to write the modified address 51 back to an indirect register for each processor cycle that involves the word chain. This causes the address in the indirect register to point to the data word whose address is one beyond the MSW in the word chain.

Figure 7:
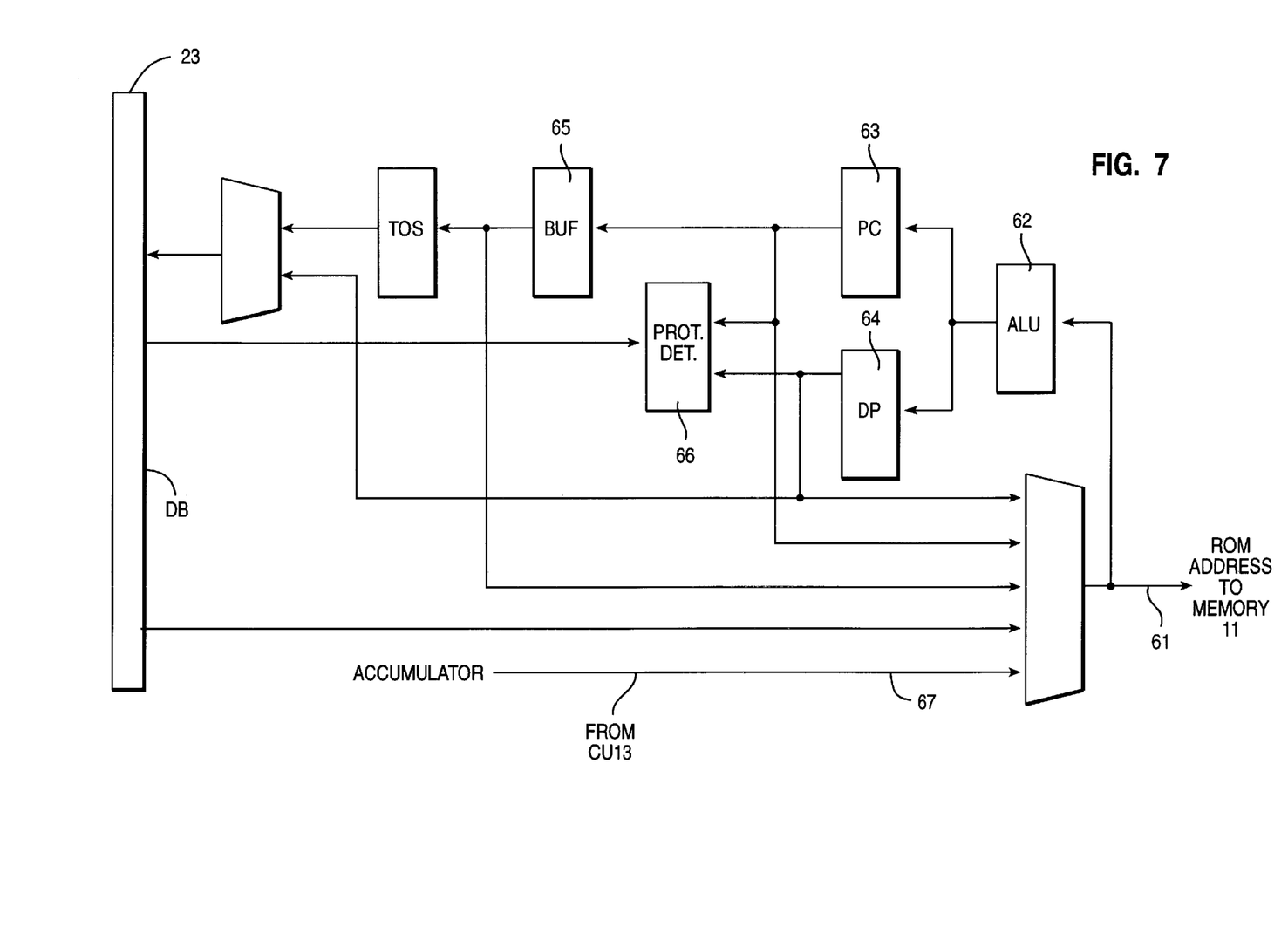
FIG. 7 shows the construction and arrangement of FIG. 1's program counter unit in greater detail.

FIG. 7 shows PCU 15 that operates to generate address 61 to FIG. 3's program memory 11. A 16-bit ALU 62 is provided for incrementing and loading ROM 11 addresses 61. Two address registers 63, PC and 64, DP operate to store ROM program address 61 in PC 63 and to store a data-pointer address in DP 64.

The content of PC 63 is saved into the PC-stack on calls and interrupts. A PC-stack comprises one hardware register (not shown) that is at the top of the stack, followed by a software stack that is provided by data memory 12, using FIG. 6's register R7-PCSTK in the indirect mode as the stack pointer. As a result, a deep stack that is defined by software is provided with little execution overhead.

The content of DP 64 is loaded from accumulator register file 36 during lookup table instructions such as LUAA and LUAM, and from PB 24 via DB 23 during the fetch of long chain constants. The content of DP 64 can be stored to data memory 12. Program detection logic 66 is included in PCU 15 to detect program address ranges that should be protected from external access.

FIG. 5 is generally similar to FIG. 1, but shows a data chain manipulation. A valuable utility of the microprocessor construction and arrangement above described relative to FIGS. 1–4 is the manipulation of data chains, i.e. the manipulation of data as a list of, or as a sequence of, a number of 16-bit words. Chain manipulation of data includes all arithmetic instructions, logical instructions, and transfer instructions. Chain instructions operate on a chain beginning with the chain's LSW and ending with the chain's MSW. For example, see accumulator register file 36 of FIG. 5 wherein a chain having 9-words has its LSW stored at register AC(3) and has its MSW stored at register AC(11).

As many as three operands are involved in data chain operations, for example two input operands and one output operand. The FIG. 3 processor 10 is capable of addressing three distinct storage locations for each of these three operands.

For example, a multiplicand operand 72 can be addressed in data storage 12, using DMAU 14 and its ALU 81 to provide an address or pointer control 51. The second input or addend operand and the output operand from ALU 31 can be addressed by FIG. 5's accumulator pointer unit 70 and its ALU 80 that uses indirect addressing and includes pointer ACP registers 49. The second input operand and the output operand can be addressed by ACP 70 as a pair, i.e. as an accumulator register AC(0)–AC(15) and as its paired offset-accumulator AC(16)–AC(31), for example see register pair AC(13) and AC(29) of FIG. 5.

Chain register counters 17 of FIG. 3 are used to store and control the length of a chain as an integer number of 16-bit words. For chain instructions or operations, DMAU 14 of FIG. 3 and ACP 70 of FIG. 5 automatically increment the chain addresses to data-memory 12 and to accumulator register file 36, respectively, beginning with the LSW, to thereby sequentially read all words or values that comprise the two word-chains contained in memory 12 and accumulator 36. Chain instructions that manipulate a chain having N words require an extra cycle-count to be added to the program sequence in order to accumulate or transfer the N+1 word that comprises the product output of hardware multiplier 30.

ALU 31 and multiplier 30, shown in FIGS. 1, 2 and 5, provide control to accommodate the manipulation of 16-bit word-chains. ALU 31 automatically propagates a carry out of its $16^{th}$ stage, and then uses it as a carry-in to ALU 31 on the next processor cycle for the next significant chain-word operation. Also, an EQUAL-TO status condition is latched and propagated to the next significant word operation, to be ANDED with the next word status. Final status of sign overflow is not latched until the last, or the MSW, is operated upon.

Hardware multiplier 30 provides a connection 71 for initial partial product. At the beginning of each multiplication operation, input 71 is set to zero. However for the second through the Nth cycle, the upper 16-bits of the last word multiply is routed to connection 71. This enables N-by-1 word multiplies to generate an N+1 word product in N+1 instruction cycles, with no software overhead.

Chain Processing and Processor Operation

An example of the operation of the preferred embodiment will now be given by an (A) (B)+(C) mathematical operation while making reference to FIG. 5. In this operation, the (B)-term comprises an 8-word chain (128-bits) multiplicand that is multiplied by an (A)-term 1-word (16-bit) multiplier, wherein the resulting product (A) (B) is added to a (C)-term addend that comprises a 9-word chain (144-bits).

In accordance with the preferred embodiment, the three data terms (A), (B) and (C) are stored in FIG. 5 as follows; the 8-word (B)-term multiplicand is stored in data memory 12 with its LSW at memory address MCND and with its MSW at memory address MCND+7; (2) the 9-word (C)-term addend is stored in accumulator register file 36 at register AC(03) through register AC(11), with the address 03 of its LSW being indirectly pointed to by the content of ACP(2); and (3) the 1-word (A)-term multiplier is stored in multiplier register 32. In addition, a chain length of 8 is set into chain register 17 of FIG. 3 for the 8-word (B)-term multiplicand.

The instruction mnemonic for this mathematical operation is MPAL.A2S.MCND, comprising 2 words to code, 1-word of opcode, plus a 1-word MCND reference.

The MCND portion of this instruction specifies that memory 12 is to be multiplied by a multiplier register 32, and that the product thereof is to be added to a value that is pointed to by register ACP(2). The A2S portion of the instruction indicates the chain mode of operation, and specifies that the accumulator register file 36 register that is pointed to by the address that is stored in pointer register ACP(2) is to be used to store the 9-word (C)-term addend and to store the final result of the (A)(B)+(C) operation. The portion MCND of the instruction specifies a direct memory 12 reference to the LSW of the 8-word (B)-term chain.

Execution of the above mnemonic takes place in 9 instruction cycles, wherein an extra cycle is enabled for multiply or barrel-shift operations that create an N+1 word output chain from an N word input chain. For additions, transfers, and logical operations, only 8 instruction cycles are required to operate on an 8-word chain.

If the (A)-term multiplier is designated as MPR, if the (B)-term multiplicand is designated as M7-M0 with its MSW M7 being stored within data memory 12 at address MCND+7, and if the (C)-term addend is designated as A8-A0 with its MSW A8 being stored within accumulator register file 36 at address 11, then the executing these 9 instruction cycles can be represented as;

MPR×M7::M6::M5::M4::M3::M2::M1::M0=P8::P7:: - - - P1::P0, A8-A0=(P8-P0)+(A8+A0)

Aspects of the FIG. 5 construction and arrangement that support chain operations of the above type include the fact that (1) the accumulator that comprises registers AC(0–15) of accumulator register file 36 is of a dual-port read/write design having a delayed pointer reference to account for the instruction cycle delay through ALU 80, (2) accumulator registers AC(0–15) and their corresponding offset-accumulator registers AC(16–31) enable the addressing of two operands with a single pointer register ACP(0)–ACP(3), wherein an accumulator register and its offset register can be used as input, as output, or as both input and output for ALU operands, and (3) the automatic incrementing of pointer registers ACP(0)-ACP(3) to consecutively read the words of a chain is a temporary process that leaves the ACP registers unchanged for correct future reference to the LSW of the chain during future chain operations.

The present embodiment's ability to extend a chain with an extended sign word allows very efficient N-word-chains-by-M word-chain multiplies to be implemented in software. The programming necessary to take advantage of this innovative hardware and architecture is well within the ability of one of ordinary skill in the art, in light of the above disclosure.

MSP58P70 Architecture

The presently preferred embodiment corresponds to the MSP58P70 by Texas Instruments, Inc. The MSP58P70 has a powerful instruction set. The instructions can individually address bit, byte, word or a string of words or bytes. The program memory is 17-bit wide and the entire 17-bit width is used for instruction set encoding. Programs are executed from internal program memory. Execution from external memory is not possible. Both the program and data memory of the MSP58P70 is restricted to internal blocks and can not be expanded externally. In the presently preferred embodiment, the program memory is One Time Programmable (OTP) ROM and limited to 32K 17-bit words, 2K of which is reserved for internal test code and is not accessible by user programs. Also in the presently preferred embodiment, the data memory is static RAM and is limited to 1024 17-bit words, 16 bits of which are an arithmetic value while the 17th bit is used as a flag or tag.

Consumer Electronics

Figure 4:
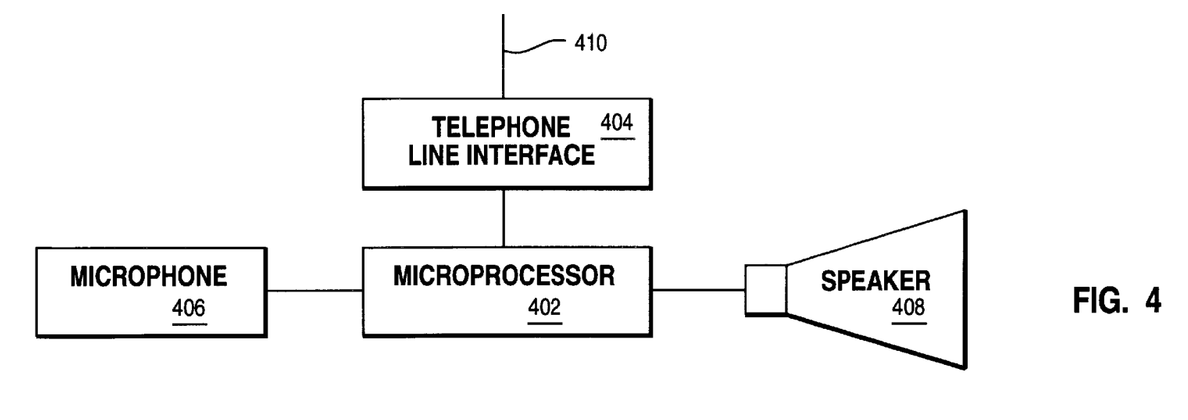
FIG. 4 depicts a telephone answering machine using this memory array.

This multiplier, and the microprocessor into which is incorporated, are designed for use in consumer electronics, such as telephone answering machines. A block diagram of an answering machine incorporating this invention is shown in FIG. 4. In this device, the processor 402 is operatively connected to a telephone line interface 404, a microphone 406, and a speaker 408. The microprocessor 402 receives and transmits sound data over the telephone line 410 via the telephone line interface 404. The microprocessor is also able to transmit sound data into the surrounding area via the speaker 408, and receive sound data from the surrounding area via the microphone 406.

Other features and details which are also contemplated for use in the preferred embodiments, but which are not necessary for practice of the claimed inventions, are disclosed in the following co-pending applications:

Att'y docket number TI-24705P, Ser. No. 60/090,668—"Method for Insuring Security of Program Data in One-Time Programmable Memory";

Att'y docket number TI-24707, Ser. No. 09/305891—"Variable Word Length Data Memory"; and Att'y docket number TI-24711P, Ser. No. 60/090,671—"Flexible Accumulator Register File for Use in High Performance Microprocessors". All of these are commonly owned with the present application, and have effective filing dates which are simultaneous with that of the present application, and are herein incorporated by reference.

Modifications and Variations

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

It should also be noted that, over time, an increasing number of functions tend to be combined into a single chip. The disclosed inventions can still be advantageous even with different allocations of functions among chips, as long as the functional principles of operation described above are still observed.

In other implementations the ripple-adders in the multiplier array could be replaced with carry-save adders, so long as there is a final 32-bit adder block incorporated to finally propagate the carries.

What is claimed is:

1. An integrated circuit structure, comprising:
   a 16-bit arithmetic logic unit (ALU);
   an array of 17-bit adders, operatively connected to said ALU and connected to one another so as to multiply one single-word-length binary number by another number of two or more words in length by multiplying the numbers one word at a time;
   an array of 16-bit accumulators, operatively connected to said ALU.

2. A microprocessor, comprising:

an instruction decoder;

a program counter, operatively connected to said instruction decoder;

a 16-bit arithmetic logic unit (ALU), operatively connected to said instruction decoder to carry out arithmetic operations;

an array of 17-bit adders, operatively connected to said ALU and connected to one another so as to multiply one single-word-length binary number by another number of two or more words in length by multiplying the numbers one word at a time;

an array of 16-bit accumulators, operatively connected to said ALU.

3. A telephone answering machine, comprising:

a control section;

a 16-bit arithmetic logic unit (ALU), operatively connected to said control section to carry out arithmetic operations;

an array of 17-bit adders, operatively connected to said ALU and connected to one another so as to multiply one single-word-length binary number by another number of two or more words in length by multiplying the numbers one word at a time;

an array of 16-bit accumulators, operatively connected to said ALU;

an interface operatively connecting said control section to a telephone line in such a way as to receive and send messages;

a microphone operatively connected to said control section in such a way as to record sound for storage with the answering machine;

a speaker operatively connected to said control section in such a way as to play back sounds stored within the answering machine.

* * * * *